(12) United States Patent
Vantrease

(10) Patent No.: US 9,481,492 B2
(45) Date of Patent: *Nov. 1, 2016

(54) INTERLOCK-ABLE CLOSURE CLIPS

(71) Applicant: Joshua D. Vantrease, Selah, WA (US)

(72) Inventor: Joshua D. Vantrease, Selah, WA (US)

( * ) Notice: Subject to any disclaimer, the term of this patent is extended or adjusted under 35 U.S.C. 154(b) by 171 days.

This patent is subject to a terminal disclaimer.

(21) Appl. No.: 13/839,871

(22) Filed: Mar. 15, 2013

(65) Prior Publication Data

US 2014/0250635 A1  Sep. 11, 2014

Related U.S. Application Data

(63) Continuation-in-part of application No. 29/447,985, filed on Mar. 8, 2013, now Pat. No. Des. 707,553.

(51) Int. Cl.
*B65D 33/16* (2006.01)

(52) U.S. Cl.
CPC ............ *B65D 33/16* (2013.01); *B65D 33/1625* (2013.01); *Y02W 90/13* (2015.05); *Y10T 24/155* (2015.01); *Y10T 24/44923* (2015.01)

(58) Field of Classification Search
CPC ............ B65D 33/1625; Y10S 206/82; E04F 2201/096; E04F 2201/098; E04F 2201/091; E04F 2201/09
USPC ........... 24/30.5 S, 30.5 R, 563; 206/820, 343
See application file for complete search history.

(56) References Cited

U.S. PATENT DOCUMENTS

| | | | |
|---|---|---|---|
| 3,164,249 A | 1/1961 | Paxton | |
| 3,164,250 A | 1/1965 | Paxton | |
| 3,270,874 A | 9/1966 | Hilton | |
| 3,767,039 A * | 10/1973 | Schroter | ............ 206/390 |
| 4,026,413 A | 5/1977 | Britt et al. | |
| 4,333,566 A | 6/1982 | Holmes | |
| 4,341,303 A | 7/1982 | Britt | |
| 4,361,935 A | 12/1982 | Paxton | |
| D299,434 S | 1/1989 | Burford | |
| 4,911,293 A | 3/1990 | Holmes | |
| 5,202,166 A * | 4/1993 | Crompton | ......... A63F 9/001 273/153 R |
| D539,140 S | 3/2007 | Irwin | |
| 7,797,890 B2 * | 9/2010 | Thrush | ............ E04F 15/10 446/116 |
| 8,163,118 B2 | 4/2012 | Irwin et al. | |
| 8,806,822 B1 * | 8/2014 | Wang | ......... E04F 15/02038 273/153 R |
| 2007/0059481 A1 * | 3/2007 | Lin | ............ E04F 15/02 428/80 |
| 2012/0011791 A1 * | 1/2012 | Lach | ......... A47G 27/0293 52/309.3 |

* cited by examiner

*Primary Examiner* — Robert J Sandy
*Assistant Examiner* — Michael Lee
(74) *Attorney, Agent, or Firm* — Svendsen Legal, LLC.

(57) ABSTRACT

A multi-closure strip of clips with one or more openings to hold the neck of a bag, which include a male and a female interlocking portion to hold the clips together in a series. Each clip includes a female pocket at a first edge, and a male tab at a second edge. Neighboring clips can interlock or mate-ably attach to the respective pockets and tabs without the need for adhesive, and without fracture of the clip material. Instead of a neighboring clip, a tag or label with a mating pocket or tab can be mate-ably attached to the clip. The clips can be made of a resilient plastic or biodegradable material, or any recyclable products.

17 Claims, 7 Drawing Sheets

INTERLOCK-ABLE CLOSURE CLIPS

This application is a Non-Provisional Utility application claiming priority to U.S. Design patent application Ser. No. 29/447,985, filed Mar. 8, 2013.

TECHNICAL FIELD

This invention pertains to closures or clips formed of flat plastic material, the closures for receiving portions of flexible bags and more particularly to strips of such clips, which can be separated by disconnecting adjacent clips along the strip. More specifically, the invention relates to an improved interlock-able clip for bags, where strips of the clips are held together by interlocking portions of the clips.

BACKGROUND OF THE INVENTION

'Bag-clip' types of closures are commonly used for holding closed the necks of flexible bags. Generally, these closure clips, also referred to as simply as 'closures,' 'clips,' or 'bag-clips,' are formed of semirigid flat, plastic material, and can be manufactured and handled in bulk as multi-closure strips of such clips, which can be separated by the automated breaking the connections between the adjacent clips of the strip, as each individual clip applied to a bag in succession. Conventionally, the individual clips in these strips are 'frangible' from adjoining, neighboring clips, in that they break apart easily to separate from the remaining strip of clips. These conventional clips have one or more 'tabs' or 'webs' that physically adjoin and interconnect each clip to the neighboring clip in the strip. U.S. Pat. Nos. 3,164,249; 3,164,250; 4,333,566; and 4,911,293, all show examples of these interconnected clip strips employing this conventional tabbed material interconnection between clips.

Several difficulties are exemplified in these prior configurations and designs of clip strips, which are separated from the strip, either manually or with a machine, by physically breaking webs or tabs of material that interconnect adjacent clips in the strip. Occasionally, and especially if the machines are in poor operating condition, the webs or tabs that interconnect adjacent clips will not shear off as desired, leaving the separated clip with jagged protrusions or ejecting a residual tab piece. This residual piece may be very small, but can hamper or foul the clip handling and bagging machinery, or end up as a contaminant into the clipped item. In addition to obtaining a clean break in the material along the separating edge of each clip, it is also necessary that the webs, tabs, or other material that interconnects adjacent clips has sufficient strength while connected in the form of the strip, so that clips do not break and detach prematurely during machine or manual handling of the strip, or in an automated process for applying the clip to an article.

The following is a disclosure of the present invention that will be understood by reference to the following detailed description taken in conjunction with the accompanying drawings.

Figure 1:
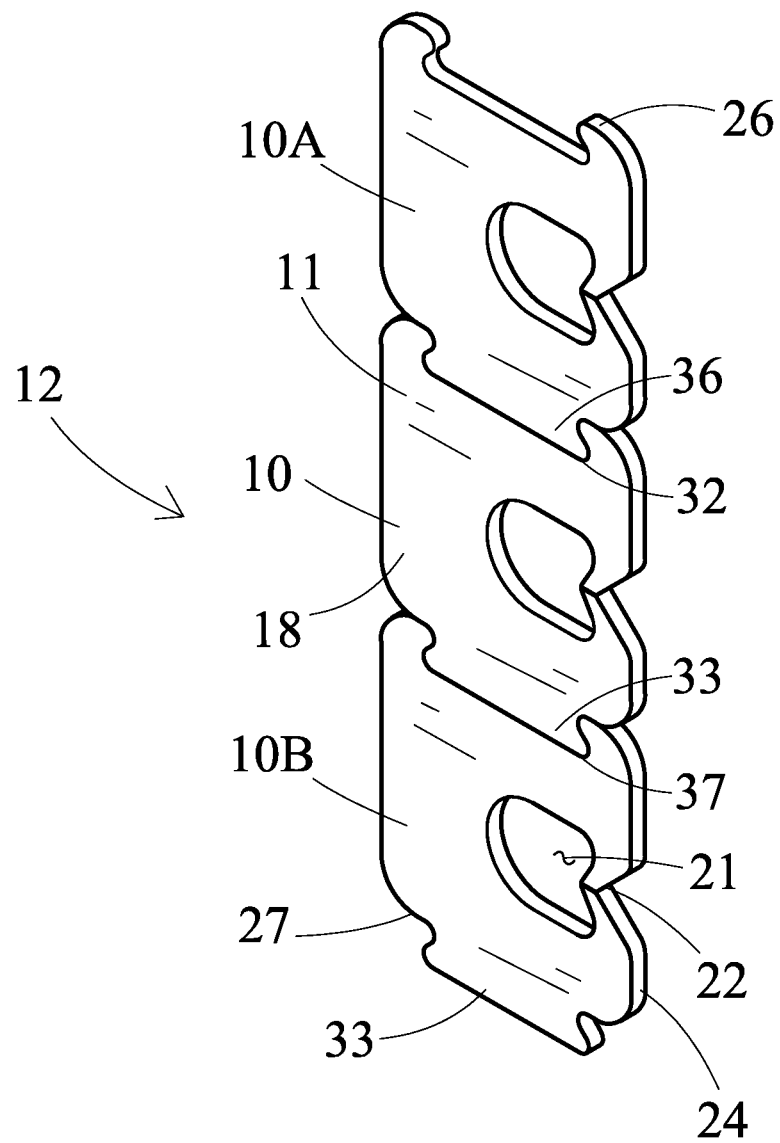
FIG. 1 is a perspective view of a strip of a multiple of interlocking clips, according to an embodiment of the invention.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and may include fragmentary views, graphic symbols, diagrammatic or schematic representations, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

Figure 2:
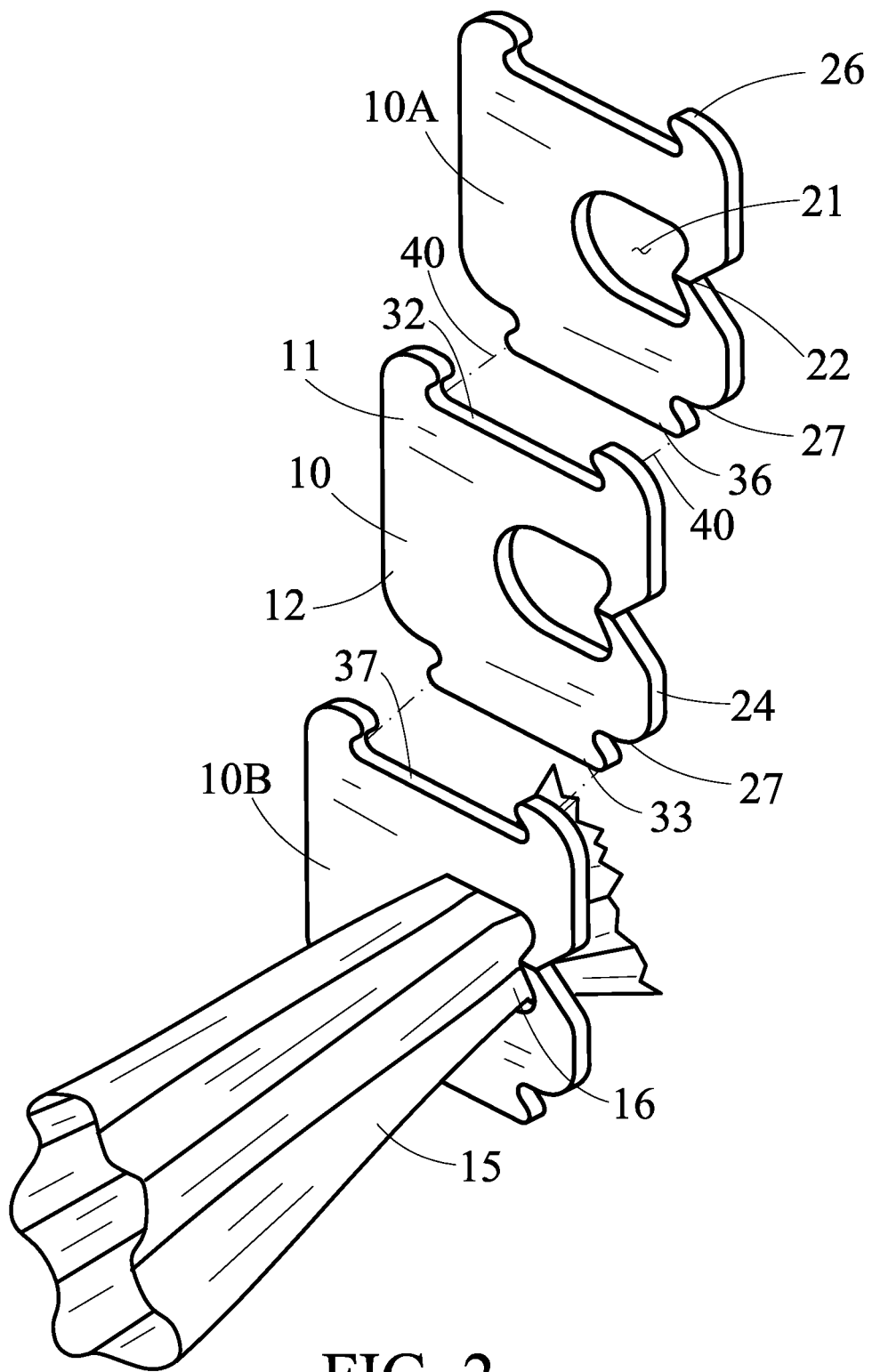
FIG. 2 is a perspective view of the interlock-able clips, according to an embodiment of the invention.

The present invention provides an improved interlocking and interlock-able clips, with FIGS. 1 through 12 showing preferred embodiments of a clip 10 for closing a bag 15, having features according the present invention, and with FIG. 1 illustrating a strip of clips 12. Each clip includes a singular pocket 32 that receives a singular tab 33. The clip is formed of a flat material 11, such as a thin plastic sheet or strip, and the clip is usable to attach to a bag 15, and more specifically to close a neck 16 of a bag, as shown in FIG. 2.

The clip 10, whether as a singular clip, in a strip 12, or in a roll 14, includes a planar clip surface 18 surrounding an aperture 21 having a mouth 22, with the mouth located on a side edge 24 of the clip. Specifically, in the form of the strip or an interlocked series of clips as shown in FIGS. 1 and 2, the strip of clips is made up of individual clips that are interlock-ably fitted together with each singular pocket 32 acting as a female element that is received into each singular tab 33 that acts as a male element. Together, the singular tab is received within and mates to the singular pocket, to form an interlock-able connection 35 between each of the clips in the series or strip. Each clip can be pushed out of the interlock-able connection in turn, when the clip receives a neck 16 of the bag 15 or other such similar item. As shown in FIG. 2, the neck of the bag can enter the mouth of the clip and is held within the aperture, closing the bag.

Figure 4:
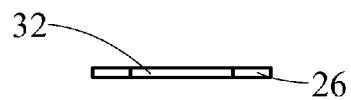
FIG. 4 is a first end view of a strip of interlocking clips, according to an embodiment of the invention.
Figure 5:
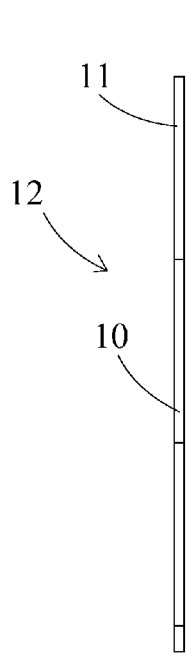
FIG. 5 is a first side view of a strip of interlocking clips, according to an embodiment of the invention.
Figure 6:
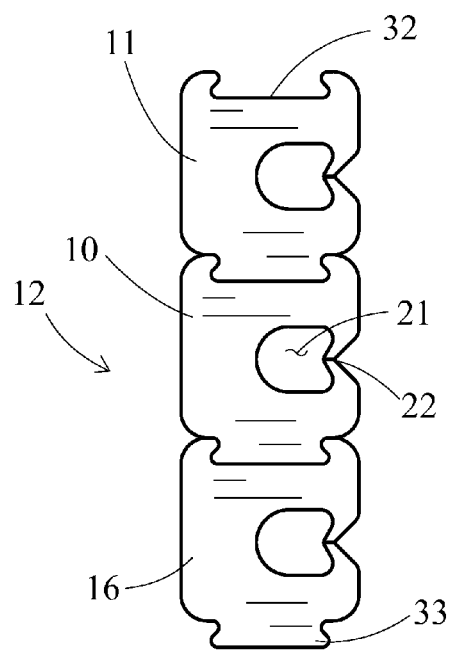
FIG. 6 is a front plan view of a strip of interlocking clips, according to an embodiment of the invention, the back plan view being a mirror image thereof.
Figure 7:
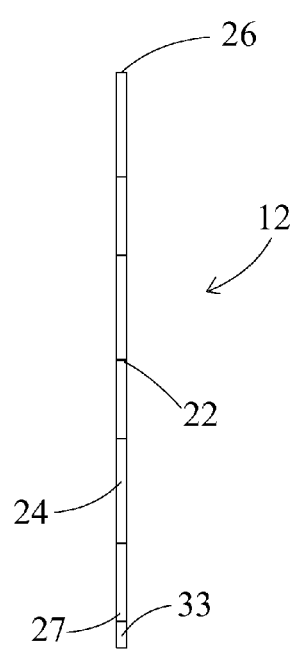
FIG. 7 is a second side view of a strip of interlocking clips, opposite to the first side view of FIG. 5.
Figure 8:
FIG. 8 is a second end view of a strip of interlocking clips opposite to the first end view of FIG. 4, according to an embodiment of the invention.

As shown in FIGS. 4 through 8, each clip 10 includes a first end edge 26, opposite on the clip from a second end edge 27. A side edge 24 of the clip is located between the first end edge and the second end edge, as shown in FIGS. 6 and 7. As shown in FIGS. 6 and 4, the first edge end of the clip includes the singular pocket 32, and as shown in FIGS. 6 and 8, the second end edge of the clip includes the singular tab 33.

As shown in FIGS. 1 and 2, a first neighboring singular tab 36 of an adjacent or first neighboring clip 10A in series, or as part of the strip 12 of clips, is interlock-ably receivable into the singular pocket 32 of the clip 10. The first neighboring singular tab is separable from the singular pocket, without fracture of the flat material 11 that forms the clips. At the opposite end of the clip from the singular pocket, the singular tab 33 of the clip is interlock-ably receivable into a second neighboring singular pocket 37 of an adjacent or second neighboring clip 10B in series, or also as part of the strip of clips. The singular tab is separable from the second neighboring singular pocket, also without fracture of the flat material 11 that forms the clips. With the present invention, the elimination of 'webs' or 'welds' conventionally employed to interconnect adjacent clips, prevents any jagged protrusions from the clips, or the generation of small residual tab pieces. Jagged protrusions and residual tab pieces can occur upon any fracturing of the flat material in a disconnection of individual clips from the strip in succession.

The clip 10 of the present invention can also conserve on space, as it is more compact along the length of the strip 12 or roll 14 of clips, as compared to prior multi-closure clips. These prior clips often leave an approximate 0.05 inch gap between each clip, creating a small wasted portion of material, which can add up to approximately 200 more clips for the a conventional 4,000 clip roll.

The terms "approximately" or "approximate" are employed herein throughout, including this detailed description and the attached claims, with the understanding that is denotes a level of exactitude commensurate with the skill and precision typical for the particular field of endeavor, as applicable.

Figure 3:
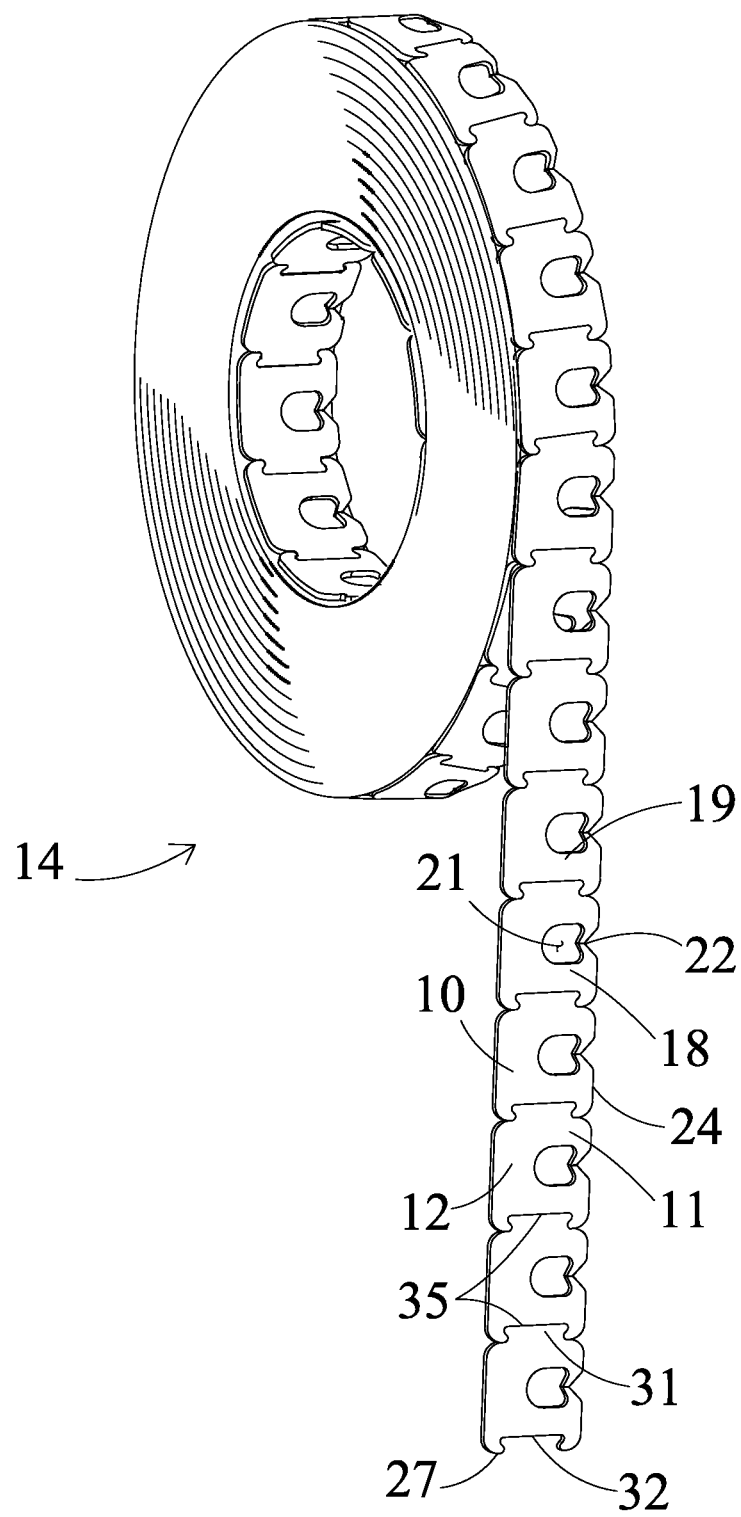
FIG. 3 is a perspective view of a rolled strip of interlocking clips, according to an embodiment of the invention.

The interlock-able connection 35 of the clip 10 of the present invention embodies a much improved multi-closure type of strip 12 in which the closures are unlocked from rather than fractured from or broken-off the remaining strip. This smoothly contoured interlock-able connection is shown in FIG. 2. Intrinsically, the edges of the clip are smoothly edged, without protruding jagged tabs or residual shards. These residual shards can either damage the bag 15, a product within the bag, or injure a person that is trying to work with or handle the clip. As shown in FIGS. 1, 3 and 6, the first neighboring singular tab 36 matches to and mates precisely within the singular pocket 32 of each clip of the strip, or alternatively the roll 14 of clips, and the singular tab 33 matches to and mates precisely within the second neighboring singular pocket 37.

Figure 9:
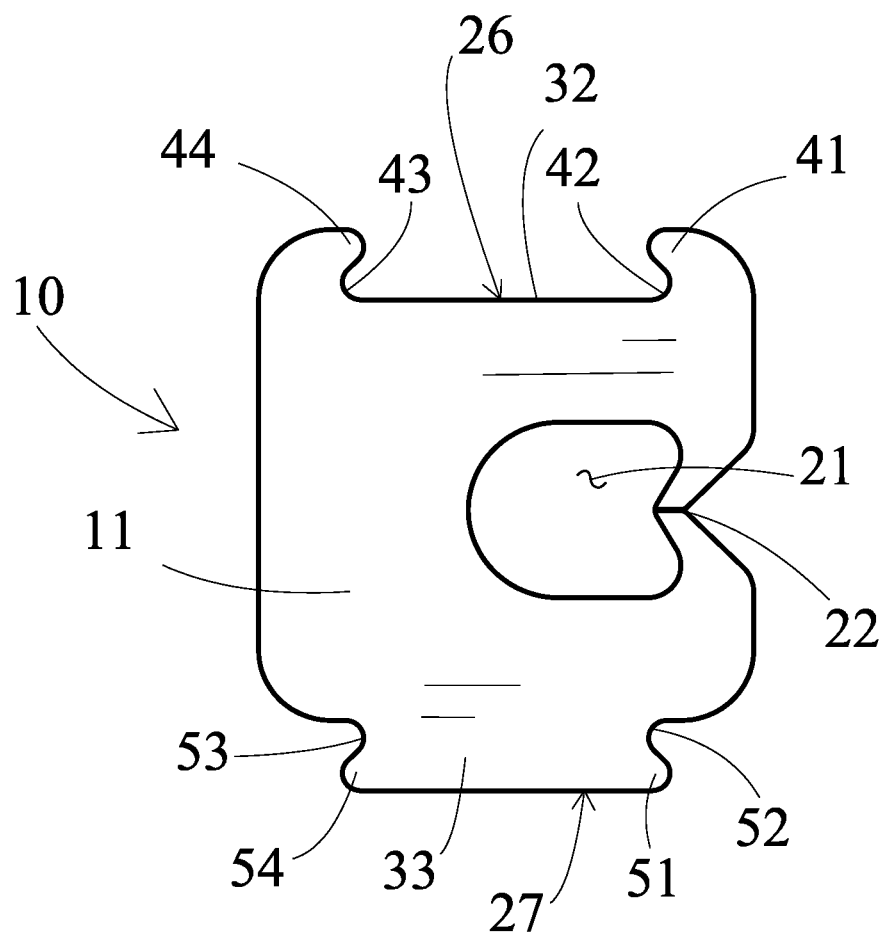
FIG. 9 is a perspective view of an interlock-able clip, according to an embodiment of the invention.

A most preferred shape and form of the interlock-able connection 35 between clips 10 is detailed in FIG. 9, which shows that the singular pocket 32 of each clip 10 includes a first rounded arm 41 opposite to a second rounded arm 44. The first rounded arm has a first socket radius 42 that departs from the first end edge 26, and smoothly transitions from the first end edge to a second socket radius 43 that rejoins the first end edge at the second rounded arm. At the opposite edge of the clip, the singular tab 33 includes a first rounded shoulder 51 opposite to a second rounded shoulder 54. The first rounded shoulder has a first tab radius 52 that departs from the second end edge 27, and smoothly transitions to a second tab radius 53 that rejoins the second end edge at the second rounded shoulder. With this most preferred shape of the interlock-able connection, the clip can be pulled along the length of the strip or bent and handled, without a premature separation or release of the interlock-able connections of each clip.

The roll 14 or the strip 12 of clips 10 for use in the present invention can be made up of any reasonably flat material 11 that is even minimally flexible, to provide for the neck 16 of the bag 15 to enter the mouth 22 of the clip, and held within the aperture 21. The roll can lead with a singular pocket 32, as shown in FIG. 3, or lead with a singular tab 33 as an alternative. Most preferably, the flat material of the clip may be any resilient plastic material, such as polystyrene or polyethylene. Fibrous materials can also be used for the flat material, such as a wood or paper produce. Additionally, the clip material can be recycled or recyclable. Also alternatively, the flat material of the clip can be biodegradable, or water soluble, or include any other material known to a person skilled in the art of thin plastic article manufacture. Advantageously, the clip of the present invention can be formed of a softer or more flexible material as compared to clips that require a breaking or fracturing of material for separation. The present clip does not require the flat material to be brittle, and can instead form the unique interlock-able connection 35 without the need for a brittle fracturing to separate neighboring clips.

Preferably, each clip 10 of the present invention is cut by a progressive punch and die and then re-mated and connected together in series to form the strip 12 of clips. This procedure is preferable in that it ensures the individual clips have no sharp edges and further allows the clip to be formed from a wide variety of materials, as discussed above. The clip of the present invention is a great improvement and help in the mechanized and automated production environment, by virtue of allowing for the creation of an endless stream of clips to a conventional bagging machine line.

Figure 10:
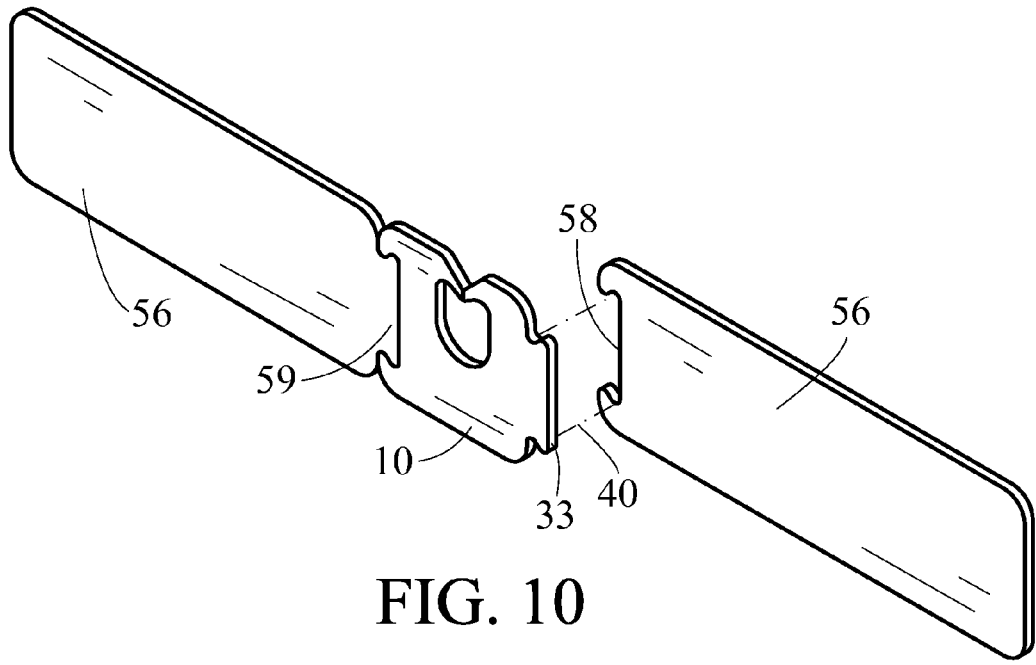
FIG. 10 is a perspective view of an interlock-able clip with an auxiliary tag, according to an embodiment of the invention.
Figure 11:
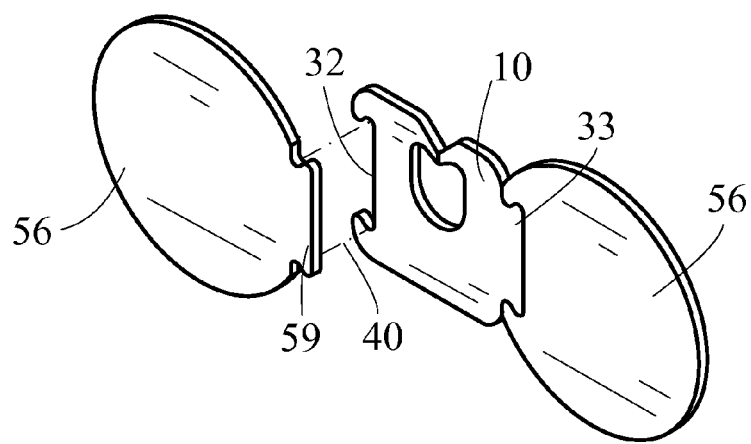
FIG. 11 is a perspective view of an interlock-able clip with an auxiliary tag, according to an embodiment of the invention.
Figure 12:
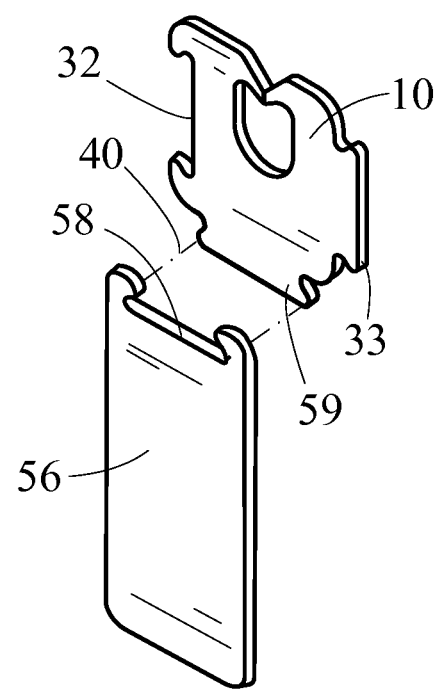
FIG. 12 is a perspective view of an interlock-able clip with an auxiliary tag, according to an embodiment of the invention.

Additionally, as shown in FIGS. 10, 11, and 12, the interlock-able clip 10 can include an auxiliary tag 56. The auxiliary tag can include any desired indicia, such as bar code, sale price, expiration date or product labeling. The tag can be any desired shape, including the generally rectangular shape of FIGS. 10 and 12, or the generally circular shape of FIG. 11. The male interlocking portion or singular tab 33 of the clip can fit into and mate-ably attach to a tag pocket 58 or female interlocking portion of the auxiliary tag. Likewise, female interlocking portion or singular pocket 32 of the clip can fit onto and mate-ably attach to a tag tab 59 or male interlocking portion of the auxiliary tag. The auxiliary tag can be removably interlock-able to the clip without adhesives, or in an alternative, can be permanently attached to the clip with an adhesive, by a heat or chemical welding, or a glue or some other conventional means of attachment.

An alternative attachment of the auxiliary tag 56, is shown in FIGS. 10 and 11, with a tag receiving tab 59 or male interlocking element for the auxiliary tag incorporated the clip 10. The tag pocket 58 of the auxiliary tag can fit onto and mate-ably attach to the tag receiving tab. Again, the auxiliary tag can be removably interlock-able to the clip without adhesives, or in an alternative, can be permanently attached to the clip with an adhesive, by a heat or chemical welding, or a glue or some other conventional means of attachment. Also alternatively, the tab and pocket elements of the clip and auxiliary tag can be switched, with the male interlocking portion or tab of placed on the auxiliary tag, and the female interlocking portion or pocket place on the clip.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A plurality of clip of a flat material to close a neck of a bag, the plurality of clips comprising a clip adjoined to a first neighboring clip and to a second neighboring clip, each of the plurality of clips comprising:
   a planar clip surface surrounding an aperture having a mouth, the mouth located on a side edge of each clip, and the neck of the bag received into the mouth of the aperture to close the neck of the bag;
   a first end edge, opposite from a second end edge, with the side edge of each clip located between the first end edge and the second end edge;
   the first end edge of the clip consisting of a singular pocket, and the second end edge of the clip consisting of a singular tab;
   the first neighboring singular tab of the first neighboring clip interlock-ably received into the singular pocket of the clip after separation from the singular pocket, the first neighboring singular tab separable from the singular pocket of the clip without fracture of the flat material;
   the singular tab of the clip interlock-ably received into the second neighboring singular pocket of the second neighboring clip after separation from the singular tab, the singular tab of the clip separable from the second neighboring singular pocket without fracture of the flat material;
   the singular pocket of each clip includes a first rounded arm and a second rounded arm, the first rounded arm having a first socket radius that departs from the first end edge of each clip, and smoothly transitions from the first end edge to a second socket radius that rejoins the first end edge at the second rounded arm; and
   the singular tab of each clip includes a first rounded shoulder and a second rounded shoulder, the first rounded shoulder having a first tab radius that departs from the second end edge of the clip, and smoothly transitions to a second tab radius that rejoins the second end edge at the second rounded shoulder.

2. The plurality of clips of claim 1, wherein:
   the first neighboring singular tab matches to and re-mates precisely within the singular pocket of the clip; and the singular tab of the clip matches to and re-mates precisely within the second neighboring singular pocket.

3. The plurality of clips of claim 1, wherein the flat material is a polystyrene.

4. The plurality of clips of claim 1, wherein the flat material is a resilient plastic.

5. The plurality of clips of claim 1, wherein the flat material is a biodegradable material.

6. The plurality of clips of claim 1, wherein the flat material is a fibrous material.

7. The plurality of clips of claim 1, wherein the flat material is a biodegradable polyethylene.

8. A strip of closure clips including a multiple of adjoined clips, with each clip of the strip of closure clips usable to close a neck of a bag, the strip of closure clips comprising:
   a flat material including a planar clip surface, the flat material surrounds an aperture in each clip of the strip of closure clips, the aperture having a mouth, the mouth located on a side edge of the strip of closure clips, and the neck of the bag received into the mouth of the aperture to close the neck of the bag;
   each clip of the strip of closure clips including a first end edge of the planar clip surface, opposite from a second end edge of the planar clip surface, with the side edge of each clip of the strip of closure clips located between the first end edge and the second end edge;
   the first end edge of each clip of the strip of closure clips consisting of a singular pocket, and the second end edge of each clip of the strip of closure clips consisting of a singular tab;
   a first neighboring singular tab of a first neighboring clip re-interlocked into the singular pocket after a separation from the singular pocket, the first neighboring clip not materially inter-connected to any clip of the strip of closure clips, and the first neighboring singular tab separable from the singular pocket without fracture of the flat material; and
   the singular tab re-interlocked into a second neighboring singular pocket of a second neighboring clip after a separation from the singular tab, the second neighboring clip not materially inter-connected to any clip of the strip of closure clips, and the singular tab separable from the second neighboring singular pocket without fracture of the flat material.

9. The strip of closure clips of claim 8, wherein:
   the singular pocket includes a first rounded arm and a second rounded arm, the first rounded arm having a first socket radius that departs from the first end edge of each clip of the strip of closure clips, and smoothly transitions from the first end edge to a second socket radius that rejoins the first end edge at the second rounded arm; and
   the singular tab includes a first rounded shoulder and a second rounded shoulder, the first rounded shoulder having a first tab radius that departs from the second end edge of each clip of the strip of closure clips, and smoothly transitions to a second tab radius that rejoins the second end edge at the second rounded shoulder.

10. The strip of closure clips of claim 8, wherein:
    the first neighboring singular tab matches to and re-mates precisely within the singular pocket; and
    the singular tab matches to and re-mates precisely within the second neighboring singular pocket.

11. The strip of closure clips of claim 8, wherein the flat material is a polystyrene.

12. The strip of closure clips of claim 8, wherein the flat material is a resilient plastic.

13. The strip of closure clips of claim 8, wherein the flat material is a biodegradable material.

14. The strip of closure clips of claim 8, wherein the flat material is a fibrous material.

15. The strip of closure clips of claim 8, wherein the flat material is a biodegradable polyethylene.

16. A plurality of closure clips of a flat material to close a neck of a bag, the plurality of closure clips comprising a closure clip adjoined to a first neighboring closure clip and to a second neighboring closure clip, each closure clip comprising:
- a planar clip surface surrounds an aperture having a mouth, the mouth located on a side edge of the closure clip, and the neck of the bag received into the mouth of the aperture to close the neck of the bag;
- the closure clip includes a first end edge, opposite from a second end edge, with the side edge of the closure clip located between the first end edge and the second end edge;
- the first end edge of the closure clip consisting of a singular pocket, and the second end edge of the closure clip consisting of a singular tab;
- the first neighboring singular tab of the first neighboring closure clip interlock-ably received into the singular pocket of the clip after separation from the singular pocket, the first neighboring singular tab separable from the singular pocket of the clip without fracture of the flat material;
- the singular tab of the clip interlock-ably received into the second neighboring singular pocket of the second neighboring closure clip after separation from the singular tab, the singular tab of the clip separable from the second neighboring singular pocket without fracture of the flat material;
- the singular pocket of each clip includes a first rounded arm and a second rounded arm, the first rounded arm having a first socket radius that departs from the first end edge of each closure clip, and smoothly transitions from the first end edge to a second socket radius that rejoins the first end edge at the second rounded arm; and
- the singular tab of each clip includes a first rounded shoulder and a second rounded shoulder, the first rounded shoulder has a first tab radius that departs from the second end edge of the closure clip, and smoothly transitions to a second tab radius that rejoins the second end edge at the second rounded shoulder.

17. The plurality of closure clips of claim 16, wherein:
- the first neighboring singular tab re-mates precisely within the singular pocket; and
- the singular tab re-mates precisely within the second neighboring singular pocket.

* * * * *